United States Patent [19]
Griffin et al.

[11] Patent Number: 5,381,919
[45] Date of Patent: Jan. 17, 1995

[54] PUSH-ON FUEL CAP

[75] Inventors: Jeffery Griffin; Robert S. Harris, both of Connersville, Ind.

[73] Assignee: Stant Manufacturing Inc., Connersville, Ind.

[21] Appl. No.: 138,399

[22] Filed: Oct. 18, 1993

[51] Int. Cl.⁶ .............................................. B65D 55/00
[52] U.S. Cl. ........................... 220/307; 220/DIG. 32; 220/DIG. 33; 220/89.1
[58] Field of Search ............... 220/307, 308, DIG. 32, 220/DIG. 33, 86.2, 89.1, 746

[56] References Cited

U.S. PATENT DOCUMENTS

| | | | |
|---|---|---|---|
| 1,438,376 | 12/1922 | Jeanmaire | 220/89.1 X |
| 3,006,499 | 10/1961 | Corbett | 220/40 |
| 3,338,455 | 8/1967 | Miller | 220/DIG. 32 X |
| 3,813,904 | 6/1974 | Wallskog | 220/DIG. 33 X |
| 3,820,680 | 6/1974 | Friend | 220/39 R |
| 4,294,376 | 10/1981 | Keller | 220/DIG. 33 X |
| 4,436,219 | 3/1984 | Reutter | 220/295 |
| 4,498,493 | 2/1985 | Harris | 137/469 |
| 4,575,136 | 3/1986 | Keller | 220/DIG. 33 X |
| 4,676,393 | 6/1987 | Daniel | 220/DIG. 33 X |
| 4,795,054 | 1/1989 | Brown | 220/307 X |
| 4,887,733 | 12/1989 | Harris | 220/203 |

*Primary Examiner*—Steven M. Pollard
*Attorney, Agent, or Firm*—Barnes & Thornburg

[57] ABSTRACT

According to the present invention, a push-on cap is provided for engaging a filler neck. The cap includes means for closing the mouth of the filler neck. This closing means includes a housing and an end member which is coupled to the housing while being axially movable relative to the housing. The cap further includes means for gripping the filler neck in response to the sliding axially inward movement between a filler neck-engaging position and a filler neck-disengaging position.

43 Claims, 5 Drawing Sheets

PUSH-ON FUEL CAP

BACKGROUND AND SUMMARY OF THE INVENTION

This present invention relates to fuel caps, and particularly, to a push-on filler neck cap. More particularly, the present invention relates to a filler neck cap which includes a gripping mechanism which enables a user to push the cap into the filler neck quickly and easily to establish a liquid fuel and vapor seal therein.

Conventional partial-turn cam-on caps and multiple-turn threaded caps are well-known types of caps for use in closing filler necks. See, for example, U.S. Pat. Nos. 4,877,733 to Harris and 3,820,680 to Friend. Although fuel caps are currently in widespread use, it would be desirable to provide an alternative cap that is simpler to install on and remove from a filler neck.

More and more gasoline stations are being equipped with self-service bays and are requiring that patrons fill their own fuel tanks. Some of those drivers have found that it is difficult to install a conventional partial-turn or multiple-turn filler neck cap during refueling. A cap that is readily installed onto and removed from a filler neck by a user without a lot of effort and that is configured to establish a sturdy sealed connection between the cap and the filler neck consistently during use would be a welcomed improvement over conventional caps. What is needed is a push-on filler neck cap that can be installed easily in the fill passageway of a filler neck.

According to the present invention, a push-on cap is provided for engaging a filler neck. The cap includes means for closing the mouth of the filler neck. This closing means includes a housing and an end member which is coupled to the housing while being axially movable relative to the housing. The cap further includes means for gripping the filler neck in response to the sliding axially inward movement of the housing into the filler neck. The gripping means is mounted in the housing for movement between a filler neck-engaging position and a filler neck-disengaging position.

In preferred embodiments of the present invention, a push-on cap is provided which slides into a filler neck to establish a liquid fuel and vapor seal therein. The cap is retained in the filler neck by at least one latch which extends out from the housing and into a gripping portion of the filler neck. The latch is spring-loaded and moves into the housing against the spring as the cap is first pushed into the filler neck and then snaps out from the housing under the urging of the spring after the cap is pushed far enough into the filler neck to cause a liquid fuel and vapor seal to be established between the cap and the filler neck. Illustratively, the cap includes three spring-loaded latches that are movable in radially outward and inward directions relative to the axis of rotation of the cap and arranged in spaced-apart relation around the circumference of the cap.

The housing itself has a body that is cylindrical in shape. This cylindrical body includes a disc-shaped support platform formed therein, a rod extending in an upward direction from the support platform, and a hollow cylindrical mounting body extending in a downward direction from the opposite side of the support platform. Furthermore, a slot is formed in the cylindrical body above the support platform for each latch. Each latch rests upon the support platform and protrudes through one of the slots.

When the user initially pushes the cap into the filler neck, a spring, which extends between each latch and the rod, yields to permit the latch to slide radially inwardly through the slot aperture into the housing. Once each latch has been retracted into the housing, the cap easily slides down into the filler neck until its sealing ring contacts a seal seat in the filler neck. At this point, the mounting body slides into the end member positioning the slot aperture adjacent to the gripping portion in the filler neck. The springs then snap the latches out through the apertures and into the gripping portion formed in the filler neck to lock the cap in the filler neck at three points and to secure a liquid fuel and vapor seal between the end member of the cap and the filler neck.

Ideally, the cap includes an internal mechanism that provides means for moving the latches simultaneously away from the gripping portion of the filler neck so that the cap will be disengaged from the filler neck where it can be withdrawn easily. The moving means is a donut-shaped core which is positioned in the housing above the latches so that the rod extends through a central aperture formed in the donut-shaped core. The core rotates independently from the housing in response to rotation of a handle cover relative to the filler necks thereby camming the latches through the apertures so that the latches are moved in unison to their retracted cap-releasing positions inside the housing.

The core includes a cam for engaging and moving each latch during rotation of the core. Moreover, each latch includes a cam follower that is positioned to engage a cam so that the cam moves the cam followers through a pre-determined arc of rotation as the core is rotated during removal of the cap from the filler neck. This camming action causes the latches to slide through the apertures and into the housing in a direction away from the gripping portion formed in the filler neck. The core is also coupled to a handle cover connected to the core so that the user must only turn the handle cover one-eighth of a rotation in a counter-clockwise or cap-removal direction to both release the liquid fuel and vapor seal and to unfasten the cap from the filler neck.

A user of a push-on fuel cap in accordance with the present invention will find that the internal gripping mechanism which is positioned in the housing and which secures a liquid fuel and vapor seal in the filler neck makes the cap easier to use than traditional fuel caps. Furthermore, the partial turn-to-remove feature of the cap which functions to pull the internal gripping mechanism away from the filler neck also provides advantages over traditional fuel caps by allowing the user to slide the cap out of the filler neck easily rather than requiring the user to turn the entire cap in the filler neck one or more revolutions.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 10 is a view similar to FIG. 7 of the cap of FIG. 9 after it has been turned to retract the spring-loaded latches into the housing to release the cap from the filler neck but before the cap has been removed from the filler neck and showing the cam followers positioned in a second end of the long branch of the V-shaped cams; and FIG. 11 is a section taken along lines 11—11 of FIG. 10.

DETAILED DESCRIPTION OF THE DRAWINGS

Figure 1:
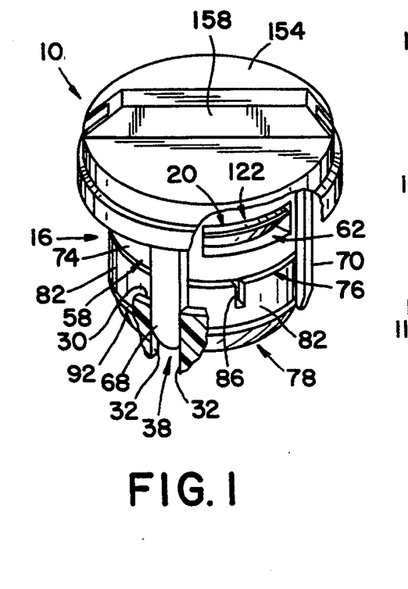
FIG. 1 is a perspective view of a push-on fuel cap according to the present invention showing the configuration of the cap as it is being inserted into a filler neck and showing the cap having a handle shell, a closure member and housing under the handle shell, and a rib extending downwardly from the handle shell along the closure member into a rib channel formed in the filler neck.

A push-on cap 10 in accordance with the present invention is shown in FIG. 1 as it would appear to a user as the cap 10 is being inserted into a filler neck 12 to close a fill passageway 14 formed in filler neck 12. Cap 10 includes a housing 16, an end closure member 18 movably coupled to the housing 16, and a latch 20 positioned in the housing 16 for movement into and out of engagement with the filler neck 12. The housing 16 also includes a cylindrical wall 58 and ribs 68, 70 extending along the length of an outer portion 74 of the cylindrical wall 58.

Ideally, a handle cover 152 is mounted on the housing 16 and three ribs and three latches (not shown in FIG. 1—see, for example, FIG. 5) are circumferentially spaced-apart about the cylindrical wall 58. The filler neck 12 is configured to receive the cap 10 and includes a mouth 30 and a set of internal flanges 32 extending downward from the mouth 30 to define a rib channel 38. This filler neck 12 is formed to include three sets of internal flanges and three rib channels (not shown in FIG. 1—see, for example, FIG. 6) to cooperate with the three ribs.

As the cap 10 is being inserted into the filler neck 12, see FIG. 1, the rib 68 extends into the rib channel 38 so that the rib 68 engages the set of internal flanges 32 to block rotation of the housing 16 relative to the filler neck 12. Ideally, the ribs 68, 70 extend over the end closure member 18 to inhibit rotation of the end closure member 18 relative to the filler neck 12 during insertion of the cap 10 into the filler neck 12.

Figure 2:
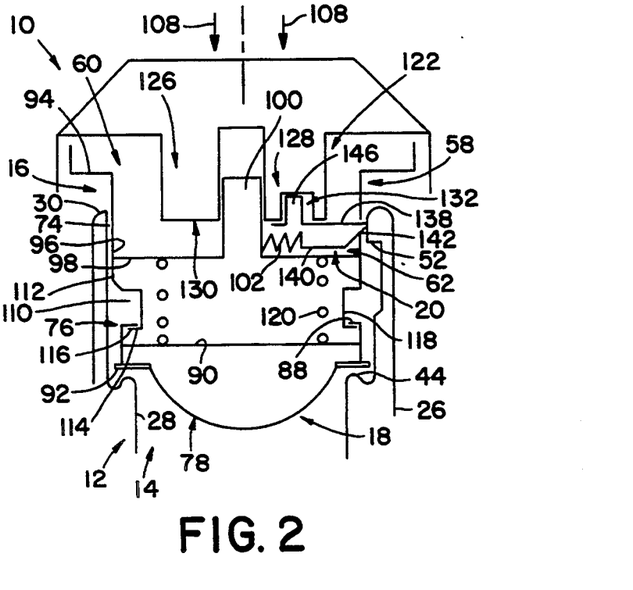
FIG. 2 is a diagrammatic view of the cap of FIG. 1 after it has been inserted into the mouth of the filler neck and showing a spring-loaded latch that has been moved to its filler neck-disengaging position by a filler neck wall and showing an uncompressed sealing ring positioned on a bottom portion of the end closure member of the cap.

As shown diagrammatically in FIG. 2, the cylindrical wall 58 defines a cavity 60 which extends into the housing 16. Additionally, an aperture 62 extends through the cylindrical wall 58 so that the latch 20, which is positioned in the cavity 60, projects out from the housing 16 and presses against the filler neck 12. The filler neck 12 has an outside wall 26, an inside wall 28 defining the fill passageway 14, and a seal seat 44 which is disposed axially inwardly from said mouth 30 internally in said filler neck 12. Sliding axially inward movement 108 of the housing 16 during installation of the cap 10 into the fill passageway 14 forces the latch 20 to yieldably move in a radially inward direction relative to the filler neck 12 through the aperture 62 and into the cavity 60. Once the latch 20 is positioned inside the housing 16 it is said to be in a filler neck-disengaging position 122.

Figure 3:
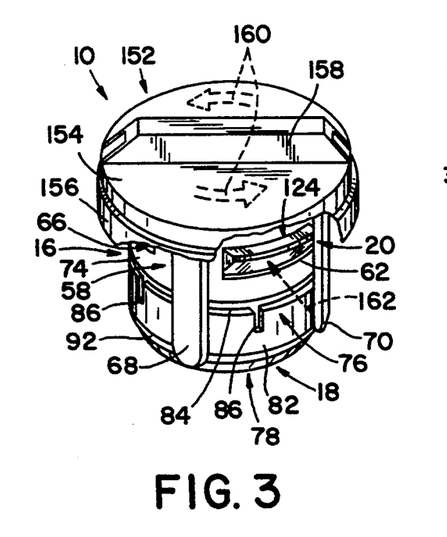
FIG. 3 is a view similar to FIG. 1 of the cap as it would appear in the filler neck after installation of the cap and movement of the spring-loaded latch to its filler neck-engaging position and showing (in dotted lines) the direction of rotational movement of the handle shell relative to the closure member and housing which will cause radially inward movement of each latch into the closure member to disengage the cap from the filler neck.

The cap 10 as it would appear following installation of the cap 10 in the filler neck 12 is shown in FIG. 3. The latch 16 protrudes through the aperture 62 to a filler neck-engaging position 124. As shown diagrammatically in FIG. 4, the latch 20, in the filler neck-engaging position 124, extends into a gripping portion 46 formed in the inside wall 28 of the filler neck 12 to secure the housing 16 in the fill passageway 14. The extension of the latch 20 into the gripping portion 46 forces the housing 16 to extend into the end closure member 18 and end closure member 18 to press against the seal seat 44, thus maintaining a liquid fuel and vapor seal between the cap 10 and the seal seat 44.

Figure 4:
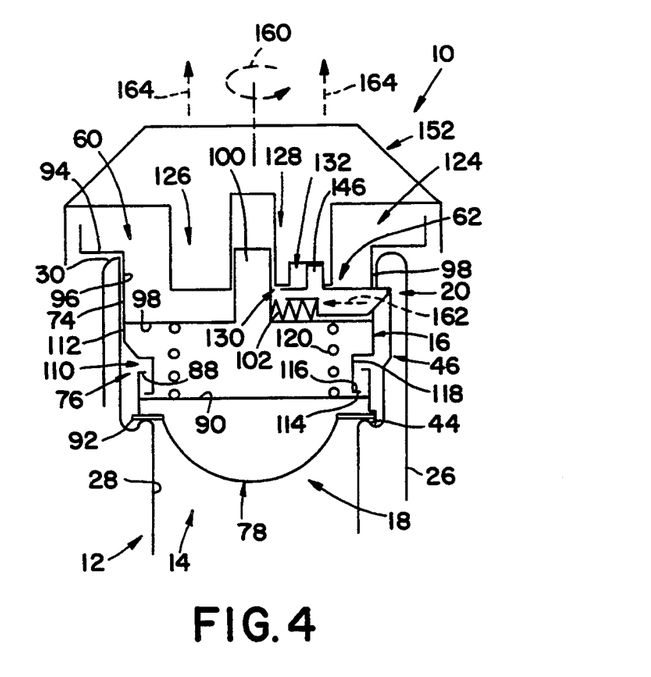
FIG. 4 is diagrammatic view of the cap of FIG. 3 in place in the filler neck showing how one of the latches engages the filler neck, how the housing slides into the closure member, how the compression spring presses the sealing ring against the seal seat formed in the filler neck, and how independent counterclockwise rotational movement of the handle relative to the housing (in the direction shown by the curved dotted line arrow) causes the radially inward movement (in direction of straight horizontal dotted line arrow) of the latch away from the filler neck allowing for movement of the cap in an axially outward cap-disengagement direction.

Furthermore, as illustrated by dotted lines in FIGS. 3 and 4, independent rotational movement 160 of a handle cover 152 relative to the housing 16 causes the radially inward movement 162 of the latch 20 through the aperture 62 and into the cavity 60. This radially inward movement 162 of the latch 20 to the filler neck-disengaging position 122 causes simultaneous axially outward movement 164 of the housing 16 relative to the filler neck 12, as shown in FIG. 4. Thus, the liquid fuel and vapor seal is released and the cap 10 may easily be withdrawn from the mouth 30 of the filler neck 12.

Figure 5:
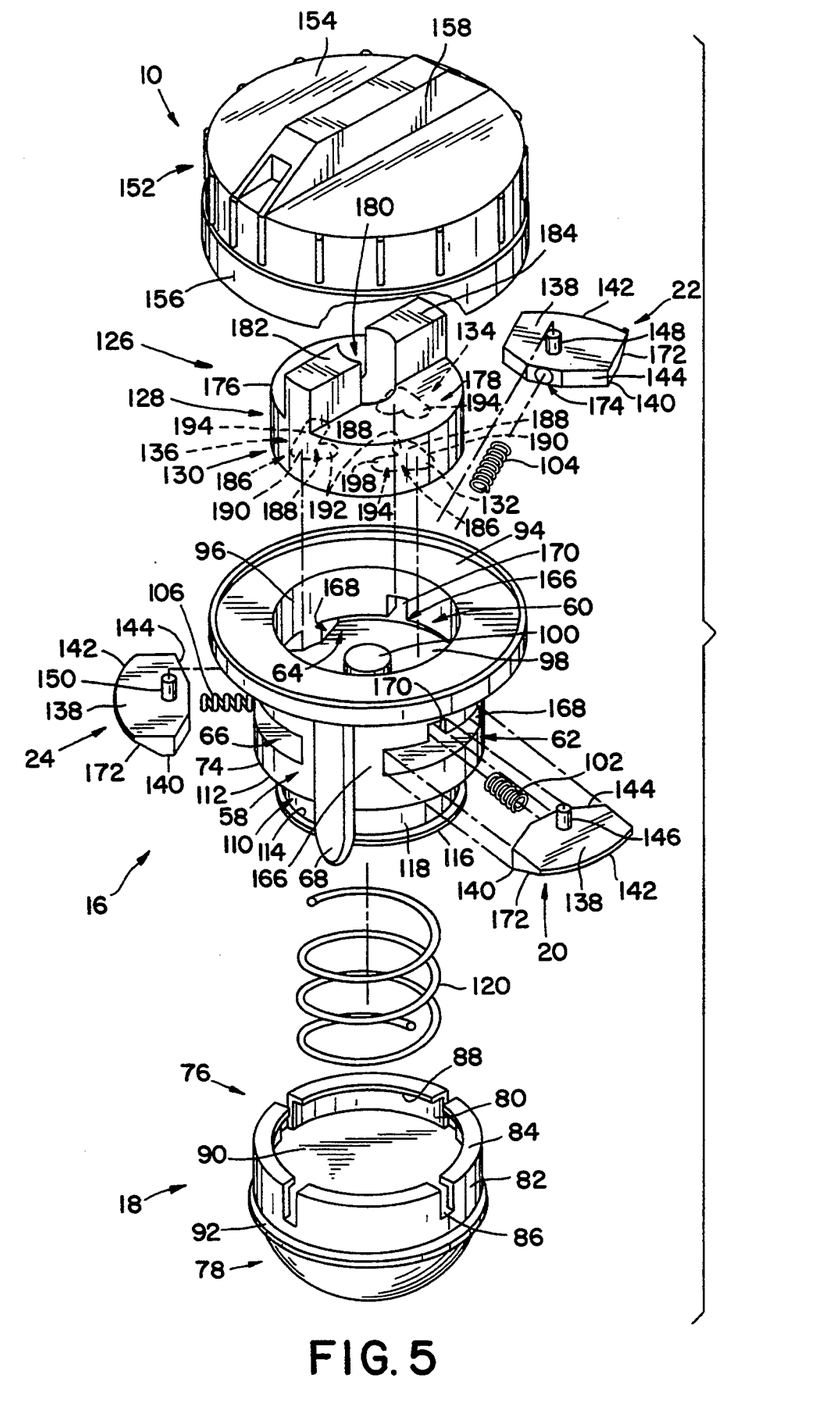
FIG. 5 is an exploded, perspective view of a preferred embodiment of the push-on cap of FIG. 1 showing a handle cover, a core having a central aperture and V-shaped cams formed therein, a cylindrical housing having a support platform, three circumferentially spaced-apart latches having cam followers engaging the V-shaped cams formed in the core, springs for yieldably biasing the latches in radially outwardly extending directions, a cup-shaped end closure member, and a compression spring extending between the end closure member and the support platform.

The end closure member 18 of the cap 10 includes a top side 76 facing the housing 16, a bottom side 78, an internal wall 80, and an external wall 82 as shown in FIG. 5. The top side 76 is includes a cup-shaped mouth 84 which is formed to extend over the housing 16. The cup-shaped mouth 84 has notches 86 which permit expansion of the diameter of the cup-shaped mouth 84 so that the housing 16 may easily be inserted into the end closure member 18 during assembly. Furthermore, an engagement lip 88 is formed around the circumference of the cup-shaped mouth 84 for mounting the end closure member 18 onto the housing 16. The end closure member 18 further includes a middle support platform 90 which is positioned in an axially inward direction relative to the cup-shaped mouth 84 and extends across the internal wall 80 of the end closure member 18. A sealing ring 92 is mounted on the external wall 82 of the end closure member 18. It is contemplated that the sealing ring 92 may be mounted onto the end closure member 18 at various positions at or between the top side 76 and the bottom side 78 by pin, screw, adhesive, or comparable mounting means.

As further illustrated in FIG. 5, the end closure member 18 is formed to be movably coupled to the housing 16. This housing 16 includes an upper lip 94, an inner portion 96, and a support platform 98 which is mounted to the inner portion 96 axially inward from the upper lip 94 and which is extended in a radial direction across the cavity 60. Three apertures 62, 64, 66 are formed in the cylindrical wall 58 axially outward from the support platform 98. The support platform 98 is formed to support three latches 20, 22, 24 thereon and the apertures 62, 64, 66 are sized for extension of the latches 20, 22, 24 therethrough. A rod 100 is also mounted on the support platform 98 and extends in an axially outward direction therefrom. The rod 100 serves as an anchor for the springs 102, 104, 106 which extend from the latches 20, 22, 24 respectively. It is appreciated that the latches 20, 22, 24 may take a number of forms in extending from the housing 16 to grip the filler neck 12.

Additionally, the housing 16 includes a hollow cylindrical mounting body 110 which extends in the axially inward direction from the support platform 98 to mount the end closure member 18 thereon. This mounting body 110 includes a first end 112 positioned at the support platform 98, a second end 114 having a flange 116, and a middle portion 118 extending therebetween. The second end 114 is formed to extend into the end closure member 18 so that the flange 116 may engage the lip 88 and so that the middle portion 118 will slide into and out of the end closure member 18. Ideally, when the cap 10 is assembled, a compression spring 120 extends through the hollow mounting body 110 between the support platform 98 in the housing 16 and the middle support platform 90 in the end closure member 18 to press the flange 116 against the engagement lip 88.

In a preferred embodiment illustrated in FIG. 5, the cap 10 includes a core 126 which enables a user to pull the latches 20, 22, 24 into the cavity 60 so that the cap 10 can be withdrawn from the filler neck 12. This core 126 has an exterior end 128 and an interior end 130 formed to cooperate with the latches 20, 22, 24, and three cams 132, 134, 136 formed in the interior end 130. The latches 20, 22, 24 include an outward side 138 formed to engage the interior end 130 of the core 126, an inward side 140 formed to engage the support platform 98, an outside portion 142 facing the filler neck 12, and an inside portion 144 facing the rod 100. Three cam followers 146, 148, 150 are attached to the outward side 138 of the latches 20, 22, 24 respectively and extend into the cams 132, 134, 136 to couple the core 126 with the latches 20, 22, 24. It is appreciated that the core 126 may take a number of forms and positions relative to the latches 20, 22, 24 within the housing 16 to cooperate with the latches 20, 22, 24.

The three apertures 62, 64, 66 are preferably arranged in spaced-apart relation about the circumference of the cylindrical wall 58 and are formed in an inverted T-shape 166 as shown in FIG. 5. The inverted T-shape 166 allows each of the cam followers 146, 148, 150 to be inserted therethrough during assembly of the cap 10. Each of the inverted T-shapes 166 includes a leg 168 positioned adjacent to the support platform 98. This leg 168 is sized for insertion of each of the latches 20, 22, 24 therethrough. The inverted T-shape 166 also includes another leg 170 bisecting the leg 168 to form approximately a 90° angle relative thereto. The leg 170 is sized for insertion of each of the cam followers 146, 148, 150 therethrough. It is appreciated that the apertures 62, 64, 66 may take on various shapes to cooperate with the shapes of the latches 20, 22, 24 which are coupled to the cam followers 146, 148, 150.

The latches 20, 22, 24 which are sized for insertion through each of the apertures 62, 64, 66 formed in the housing 16 are further formed to cooperate with the filler neck 12 to aid in the insertion of the housing 16 into the filler neck 12. Each of the latches 20, 22, 24 include a tapered portion 172 positioned on the outside portion 142 of the inward side 140. This tapered portion 172 engages the mouth 30 during insertion of the cap 10 into the filler neck 12 and guides the latches 20, 22, 24 in a radially inward direction relative to the filler neck 12.

Furthermore, the latches 20, 22, 24 which rest upon the support platform 98 are formed to be securely attached in the housing 16 by the springs 102, 104, 106. Each of the latches 20, 22, 24 include a spring aperture 174 formed in the inside portion 142 into which the springs 102, 104, 106 extend respectively. The springs 102, 104, 106 are mounted in the apertures 174 so that the springs 102, 104, 106 extend between the latches 20, 22, 24 and the rod 100. These springs 102, 104, 106 both yieldably permit radially inward movement 162 of the latches 20, 22, 24 and snap the latches 20, 22, 24 in a radially outward direction.

The core 126 is also securely mounted in the housing 16. The core 126 includes an edge 176, a middle portion 178, and a central aperture 180 extending through the middle portion 178. The core 126 is positioned in the housing 16 so that the rod 100 extends through the central aperture 180 and so that the core 126 rests above the latches 20, 22, 24. The core 126 further includes hubs 182, 184 positioned on the exterior end 128 at approximately a 180° angle relative to one another. The hubs 182, 184 are separated from one another by the central aperture 180 and extend upwardly adjacent the rod 100 into the handle cover 152 to couple the core 126 to the handle cover 152.

The handle cover 152 includes a base 154 which is formed to engage the core 126 and a mount 156 which is formed to engage the upper lip 94 of the housing 16 as shown in FIG. 5. Ideally, the base 154 includes a grasping portion 158 for enabling a user to more easily manipulate the cap 10. As the user rotates the handle cover 152, the base 154 engages the core 126 causing rotation of the core 126 on the rod 100 in the housing 16. It is appreciated that the core 126 may be coupled to the handle cover 152 by pin, screw, adhesive or comparable coupling means.

Figure 6:
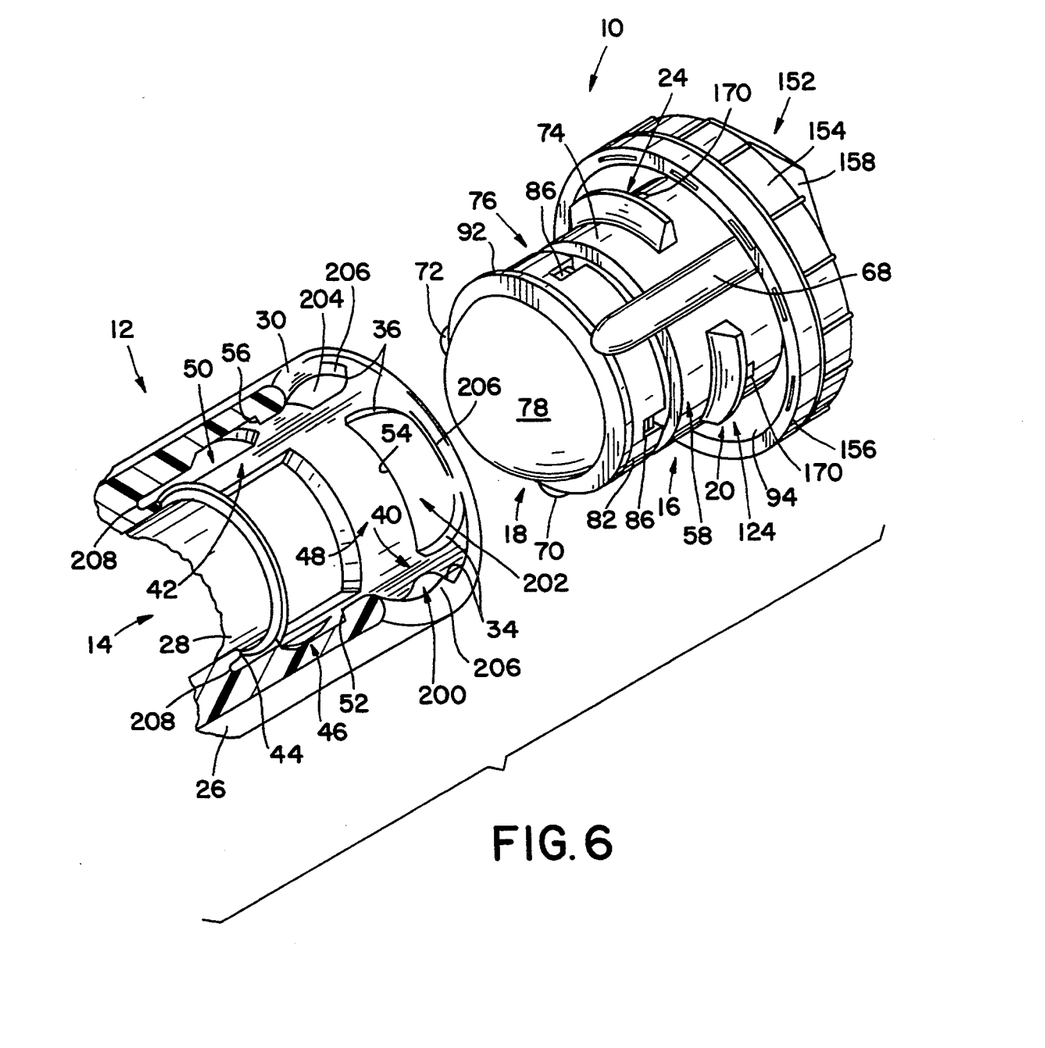
FIG. 6 is a perspective view of the push-on cap of FIG. 5 as it is about to be inserted into a filler neck provided with rib channels, internal flanges, and gripping portions.

The filler neck 12 is configured to receive the cap 10 as shown in FIG. 6. The filler neck 12 has three guiding portions 200, 202, 204 arranged in spaced-apart relation about the circumference of the mouth 30. The guiding portions 200, 202, 204 include a first end 206 positioned at the mouth 30 of the filler neck 12 and a second end 208 positioned at the seal seat 44. Furthermore, three gripping portions 46, 48, 50 are arranged in spaced-apart relation about the circumference of the inside wall 28 between the first end 206 and the second end 208 of each of the guiding portions 200, 202, 204.

The intersection of the guiding portions 200, 202, 204 and the gripping portions 46, 48, 50 forms three gripping flanges 52, 54, 56 within the filler neck 12. Furthermore, three rib channels 38, 40, 42 extend in an axially inward direction between the spaced-apart guiding portions 200, 202, 204. These channels 38, 40, 42 are configured for insertion of ribs 68, 70, 72 respectively therein. The intersection of the rib channels 38, 40, 42 and the guiding portions 200, 202, 204 forms three sets of internal flanges 32, 34, 36 therebetween. The internal flanges 32, 34, 36 permit the axial insertion of the ribs 68, 70, 72 into the fill-passageway 14 and prevent the rotation of the housing 16 in the filler neck 12. It will be appreciated that such rib channels 38, 40, 42 may take a number of forms to cooperate with ribs 68, 70, 72.

Figures 7, 8, 9:
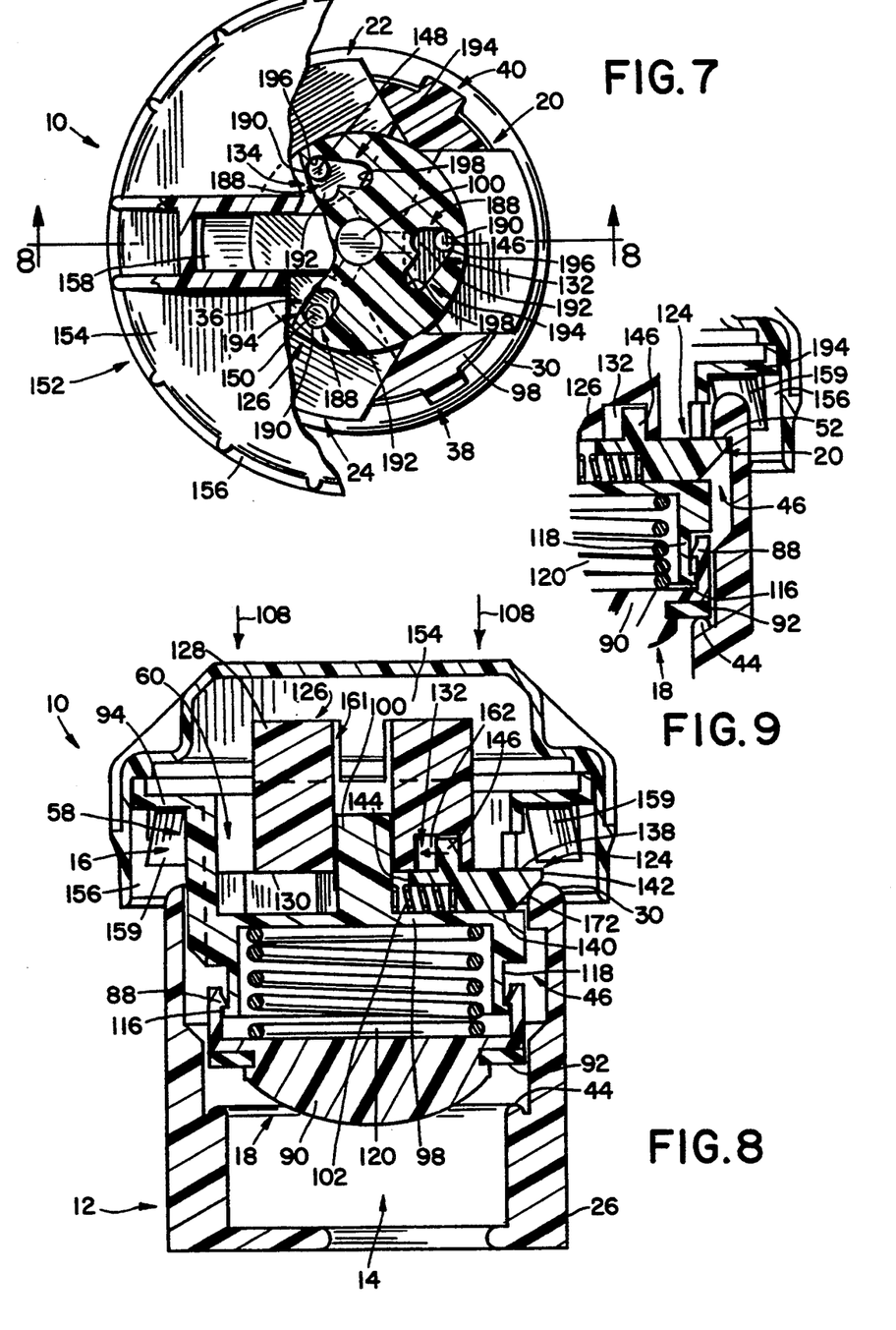
FIG. 7 is a top sectional view of the cap of FIG. 1 as it is about to be inserted into the filler neck and showing the three latches in their filler neck-engaging position extending across the mouth of the filler neck, a core having V-shaped cams with a short branch and a long branch, and cam followers positioned in first ends of the short branches of the V-shaped cams.
FIG. 8 is a section taken along lines 8—8 of FIG. 7 showing the cap as it is being pushed into the filler neck but before the cap is seated in its sealed and closed position in the filler neck.
FIG. 9 is a section through the cap of FIG. 8 after the cap has been pushed into the filler neck of FIG. 8 far enough to reach its filler-neck closing position and showing the loaded compression spring pressing the sealing ring against the seal seat and the latch against a gripping flange so that a liquid fuel and vapor seal is established and maintained in the filler neck.

The three cams 132, 134, 136 which are formed in the core 126 are V-shaped 186 in order to allow for the radially inward movement 162 of the cam followers 146, 148, 150 during the axially inward movement 108 of the housing 16 in the mouth 30 of the filler neck 12, see FIG. 7. Each of the cams 132, 134, 136 include a short branch 188 having a first end 190 and second end 192 and a long branch 194 having a first end 196 and a second end 198. The first end 190 of the short branch is positioned at the edge 176 of the core 126 and the second end 192 is positioned in the middle portion 178 at approximately a 90° angle relative to the edge 176. The first end 196 of the long branch 194 is positioned at the first end 190 of the short branch 188 at the edge 176 of the core 126. The second end 198 of the long branch 194 is positioned in the middle portion 178 at approximately a 45° angle relative to the short branch 188. Before insertion of the cap 10 into the mouth 30 of the filler neck 12, the cam followers 146, 148, 150 are positioned in the first end 190 of the short branch 188.

When the housing 16 is pushed into the mouth 30 of the filler neck 12, as shown in FIG. 8, the tapered portion 172 of the latch 20 engages the mouth 30 of the filler neck 12 pushing the latch 20 in a radially inward direction. This pressure causes radially inward movement 162 of the cam follower 146 through the short branch 188 of the cam 132 from the first end 190 toward the second end 192 and the radially inward movement 162 of the latch 20 through the aperture 62 and into the housing 16.

Furthermore, the axially inward movement 108 of the housing 16 into the filler neck 12 following the engagement of the sealing ring 92 with the seal seat 44 forces the middle portion 118 to extend into the end closure member 18 see FIG. 9. This extension permits the spring 102 to snap the cam follower 146 through the short branch 188 from the second end 192 toward the first end 190 which causes movement of the latch 20 into the gripping portion 46. Furthermore, the extension of the middle portion 118 into the end closure member 18 disengages the flange 116 from the engagement lip 88 thus loading the compression spring 120. The compression spring 120 exerts pressure against the support platform 98 in the housing 16 and against the middle support platform 90 in the end closure member 18 forcing the latch 20 to engage the gripping flange 52 and the sealing ring 92 to engage the seal seat 44. Thus, a liquid fuel and vapor seal is established and maintained between the seal seat 44 and the sealing ring 92.

Ideally, the core 126 rotates in the housing 16 in response to the independent rotational movement 160 of the handle cover 152, relative to the housing 16, as shown in FIG. 10. This rotation 160 causes the cam follower 146 which is initially positioned at the first end 196 to move through the long branch 194 from the first end 196 until it is positioned at the second end 198. This movement of the cam follower 146 generates the radially inward movement 162 of the latch 20 into the filler neck 12.

To permit rotational movement of the handle cover, the mount 156 of the handle cover 152 includes a sloped portion 159 for trapping the upper lip 94 between the base 154 and the mount 156, as shown in FIG. 11. The upper lip 94 rests upon the sloped portion 159 thus preventing disengagement of the handle cover 152 from the housing 16 while permitting rotation of the handle cover 152 thereon. The sloped portion 159 also aids in the insertion of the handle cover 152 onto the housing 16 during manufacturing. The base 154 of the handle cover 152 is further formed to include core slots 161. The hubs 182, 184 of the core 126 extend into the core slots 161 and engage the base 154 during rotation of the handle cover 152 causing simultaneous rotation of the core 126 in the housing 16.

Rotation of the core 126 causes the cams 132, 134, 136 contact the cam followers 146, 148, 150 through a predetermined arc of rotation of the core 126 thus producing the radially inward movement 162 of the latches 20, 22, 24 relative to the filler neck 12. This radially inward movement 162 causes the placement of the latches 20, 22, 24 in the filler neck-disengaging position 122. Upon reaching the filler neck-disengaging position 122, the loaded compression spring 120 compels the axially outward movement 164 of the housing 16 from the filler neck 12, as shown in FIG. 11. This axially outward movement 164 is accomplished by forcing the middle portion 86 of the mounting body 110 out from the end closure member 18 until the engagement lip 88 engages the flange 116. Following the axially outward movement 164, the latch 20 lies axially outward from the gripping portion 46 and is in its filler neck-disengaging position 122, thus allowing for easy withdrawal of the cap 10 from the filler neck 12.

The spring 102, however, continues to urge the cam follower 146 in a radially outward direction so that the latch 20 continues to engage the inside wall 28 of the filler neck 12. This urging results in rotational realignment 165 of the handle cover 152 relative to the housing 16. Rotational realignment 165 continues following withdrawal of the cap 10 from the mouth 30 of the filler neck 12 until the cam followers 146, 148, 150 have moved through the long branch 194 toward the first end 190 of the short branch 188 and until the latch 20 is repositioned in the filler neck-engaging position 124. Thus, the cap 10 is ready to be installed in the filler neck 12 at the end of the refueling process.

To install the cap 10 in the filler neck 12, a user first grasps the handle cover 152 of the cap 10 in its filler neck-engaging position 124. The ribs 68, 70, 72 are then aligned with the rib channels 38, 40, 42 formed along the inside wall 28 of the filler neck 12. Once aligned, the user simply pushes the cap 10 in an axially inward cap-installation direction until the user feels the latches 20, 22, 24 snap into the gripping portions 46, 48, 50 of the filler neck 12. The snapping of the latches 20, 22, 24 creates a clicking sound which also serves as a notice to the user that the cap 10 has been successfully installed and that a liquid fuel and vapor seal has been established between the seal seat 44 and the sealing ring 92.

To remove the cap 10 from the filler neck 12, a user simply turns the handle cover 152 approximately one-eighth of a rotation and pulls the disengaged cap 10 from the mouth 30 of the filler neck 12. The independent rotational movement 160 of the handle cover 152 causes the core 126 to rotate within the housing 16 thereby camming the latches 20, 22, 24 through the apertures 62, 64, 66 away from the gripping portions 46, 48, 50 of the filler neck 12. The latches 20, 22, 24 are then pushed in the axially outward cap-disengagement direction by the compression spring 120. The cap 10 is now in its filler neck-disengaging position 122 so that it can be withdrawn easily from the mouth of the filler neck 12. Conveniently, the withdrawn cap 10 undergoes rotational realignment 165 until it resumes its filler neck-engaging position 124 and thus, with the cam followers 146, 148, 150 positioned in the first end 190 of the short branch 188, the cap 10 is ready to be installed in the filler neck 12 at the end of the refueling process.

It is easy to install and remove a push-on fuel cap 10 in accordance with the present invention using very little effort. The user must simply push the cap 10 into the filler neck 12 to create a sturdy sealed connection between the cap 10 and the filler neck 12. Once installed, the user must simply turn the handle 110 approximately one-eighth of a rotation and slide the cap 10 out from the filler neck 12.

Although the invention has been described in detail with reference to certain preferred embodiments, variations and modifications exist within the scope and spirit of the invention as described and defined in the following claims.

We claim:

1. A cap engageable with a filler neck having a mouth and a seal seat disposed axially inwardly from said mouth internally in said filler neck, the cap comprising
means for closing the mouth of the filler neck, the closing means including a housing and an end closure member coupled to the housing, the end closure member being axially movable relative to the housing and having a sealing ring configured to engage the seal seat upon slidable insertion of the housing into the filler neck in an axially inward cap-installation direction, and means for gripping the filler neck in response to sliding axially inward movement of the housing in the filler neck, the gripping means being mounted in the housing for movement between a filler neck-engaging position and a filler neck-disengaging position.

2. The cap of claim 1, further comprising means for moving the gripping means to the filler neck-disengaging position.

3. The cap of claim 2, wherein the moving means includes a core rotatably coupled in the housing, a cam follower appended to the gripping means, and a cam formed in the core, and the cam includes means for contacting the cam follower through a pre-determined arc of rotation of the core to move the gripping means in an radially inward direction relative to the filler neck permitting movement of the housing in an axially outward cap-disengagement direction.

4. The cap of claim 2, wherein the moving means includes a handle cover and means for coupling the handle cover to the gripping means so that the gripping means is moved in a radially inward direction relative to the housing in response to rotational movement of the handle cover relative to the filler neck.

5. The cap of claim 4, wherein the gripping means includes three spring-loaded latches positioned in spaced-apart relation about the circumference of the housing and the coupling means includes a core positioned in the housing, the core rotatably actuates the latches in response to rotational movement of the handle cover relative to the filler neck.

6. The cap of claim 4, wherein the handle cover includes a base and means for movably mounting the base on the housing so that the base rotates independently of the housing.

7. The cap of claim 6, wherein the housing includes a cylindrical wall defining a cavity therein, an outer wall, an inner wall, a support platform being mounted to the inner wall and extending in a radial direction across the cavity, and a rod mounted to the support platform extending in an axially outward direction, the latch includes an inside portion and an outside portion, and the yielding means includes a spring extending through the cavity between the inside portion of the latch and the rod.

8. The cap of claim 1, wherein the gripping means includes a latch and means for yieldably allowing passage of the latch in the radially inward direction in response to the sliding axially inward movement of the housing in the mouth of the filler neck.

9. The cap of claim 8, wherein the yielding means includes means for snapping the latch in a radially outward direction relative to the housing for engagement with the filler neck.

10. The cap of claim 1, wherein the housing includes a cylindrical wall extending in the axially inward direction, the wall being formed to include an aperture, and the gripping means extends through the aperture.

11. The cap of claim 10, wherein the gripping means is a latch having an inside portion positioned in the housing, an outside portion extending from the aperture outside the housing, and means for aiding radially inward movement of the outside portion through the aperture in response to pushing the latch into the mouth of the filler neck.

12. The cap of claim 1, wherein the housing is formed to include means for supporting the gripping means and a mounting body extending downward from the supporting means, the mounting body having means for yieldably engaging the end closure member.

13. The cap of claim 12, wherein the end closure member includes a cup-shaped mouth having an engagement lip, the mounting body extends into the cup-shaped mouth and the engagement lip interacts with the engagement means.

14. The cap of claim 1, wherein the filler neck includes an internal flange and the housing includes means for contacting the internal flange to permit axial movement of the housing into and out of the filler neck and to block rotation of the housing relative to the filler neck.

15. The cap of claim 14, wherein the housing includes an outer wall and an inner wall, and the contacting means is a rib formed on the outer wall.

16. The cap of claim 15, wherein the rib includes means for inhibiting rotation of the end closure member relative to the filler neck during axial movement of the housing into and out of the filler neck.

17. The cap of claim 1, wherein the housing includes a cylindrical wall defining a cavity extending therein, an inner wall, an outer wall, a support platform being mounted to the inner wall and extending in a radial direction across the cavity, and a rod mounted to the support platform extending in an axially outward direction and the gripping means includes a latch being seated on the support platform and a spring extending between the latch and the rod.

18. The cap of claim 17 further comprising a cam follower positioned on the outward side of the latch and a core being formed to include a central aperture, an interior end and an exterior end relative to the filler neck, and a cam formed in the interior end, the rod extending through the central aperture, the interior end of the core engaging the outward side of the latch, and the cam follower extending into the cam.

19. The cap of claim 18, wherein the core further includes a hub extending in an axially outward direction from the external end.

20. The cap of claim 19, further comprising a handle having a base and means for mounting the base on the hub so that the core rotates in the housing in response to rotational movement of the handle relative to the filler neck.

21. A cap engageable with a filler neck having a mouth and a seal seat disposed axially inwardly from said mouth internally in said filler neck, the cap comprising
means for closing the filler neck, the closure means including an end closure member and means for establishing a seal between the end closure member and the seal seat,
a housing movably coupled to the closure means, the housing being sized to extend into the filler neck through the mouth and formed to include a cylindrical wall having an aperture, and
means for gripping the filler neck in response to the pushing of the seal establishing means against the seal seat establishing a liquid fuel and vapor seal therebetween, the gripping means being formed for movement between a filler neck-engaging position and a filler neck-disengaging position and mounted in the housing, the gripping means including a latch and means for snapping the latch through the aperture for engagement with the filler neck.

22. The cap of claim 21, further comprising means for releasing the liquid fuel and vapor seal, the releasing means including means for moving the latch to the filler neck-disengaging position and means for compelling movement of the housing in an axially outward cap-disengagement direction.

23. The cap of claim 22, wherein the compelling means includes a compression spring extending between the housing and the end closure member so that the housing moves in the axially outward direction in response to the movement of the gripping means to the filler neck-disengaging position.

24. The cap of claim 22, wherein the moving means includes a core formed for rotational movement within the housing and means for pulling the latch through the aperture when the core is rotated relative to the housing.

25. The cap of claim 24, wherein the pulling means includes a cam follower attached to the latch and means for camming the cam follower for movement of the latch in a radially inward direction through the aperture to the filler neck-disengaging position.

26. The cap of claim 25, wherein the core has an exterior end and an interior end relative to the mouth and the camming means is a cam formed in the interior end and configured to extend over the cam follower.

27. The cap of claim 25, wherein the camming means is a cam, and the cam is formed to include means for permitting the radially inward movement of the cam follower when the latch is pushed into the mouth of the filler neck.

28. The cap of claim 21, wherein the end closure member has a cup-shaped mouth and the housing is formed for axial movement into the cup-shaped mouth in response to pushing the seal establishing means against the seal seat.

29. The cap of claim 28, further comprising means for yieldably allowing passage of the housing in the cup-shaped mouth, the yielding means extending between the housing and the end closure member.

30. The cap of claim 29, wherein the filler neck contains a gripping portion having a flange, and the latch extends into the gripping portion engaging the flange.

31. The cap of claim 30, wherein the yielding means further includes means for pushing the housing in an axially outward direction so that the latch is pressed against the flange securing the housing in the filler neck.

32. The cap of claim 21, wherein the cylindrical wall is formed to include three apertures and the gripping means includes three latches extending through the three apertures in the filler neck-engaging position.

33. The cap of claim 21 having means for inhibiting rotation of the cylindrical wall in the filler neck.

34. A cap engageable with a filler neck having a mouth and a seal seat disposed axially inwardly from said mouth internally in said neck, the cap comprising
means for closing the filler neck, the closure means including a housing and means for establishing a seal on the seal seat, the seal means being coupled to the housing for axial movement therewith relative to the filler neck,
means for gripping the filler neck in response to the pushing of the housing into the mouth of the filler neck, the gripping means being mounted in the housing for movement between a filler neck-engaging position and a filler neck-disengaging position, and
means for moving the gripping means from the filler neck-engaging position to the filler neck-disengaging position.

35. The cap of claim 34, wherein the moving means includes means for engaging the gripping means and means for pulling the gripping means in a radially inward direction relative to the filler neck.

36. The cap of claim 35 wherein the housing is formed to include an upper lip, a cylindrical wall extending axially inwardly from said upper lip, and means for inhibiting rotation of the wall in the filler neck and the engaging means includes a handle and means for movably mounting the handle to the upper lip for rotational movement relative to both the housing and to the filler neck.

37. The cap of claim 35, wherein the engaging means is a core mounted in the housing and the pulling means includes a cam formed in the core and means for following the cam so that the gripping means moves in the radially inward direction through the aperture in response to rotational movement of the core within the housing.

38. The cap of claim 34, wherein the housing includes a cylindrical wall extending in the axially inward direction relative to the filler neck, the wall is formed to include an aperture and the gripping means extends through the aperture in the filler neck-engaging position.

39. The cap of claim 34, wherein the filler neck is formed to include a gripping portion, the seal means includes an end closure member having a cup-shaped mouth and a seal ring coupled to the end closure member, and the gripping means includes a latch and means for snapping the latch into the gripping portion in response to pushing the housing into the cup-shaped mouth of the end closure member.

40. The cap of claim 39, wherein the end closure member includes an internal wall and means for permitting yieldable sliding axially inward movement of the housing along the internal wall in response to the pressing of the seal ring on the seal seat so that the gripping means abuts the gripping portion of the filler neck.

41. The cap of claim 34, wherein the housing includes a cylindrical wall defining a cavity extending therein, an inner wall, an outer wall, a support platform being mounted to the inner wall and extending in a radial direction across the cavity, and a rod mounted to the support platform extending in an axially outward direction, the gripping means includes a latch seated on the support platform and a spring extending between the latch and the rod, and the moving means is a cam follower positioned on the latch and a core being formed to include a central aperture and a cam, the rod extends through the central aperture and the core is seated on the latch so that the cam extends over the cam follower.

42. The cap of claim 34, wherein the moving means is a cam follower positioned on the gripping means, a core having an internal end and an external end relative to the filler neck, and a cam formed in the internal end, the core is seated on the gripping means so that the cam extends over the cam follower.

43. A cap engageable with a filler neck having a mouth and a seal seat disposed axially inwardly from said mouth internally in said filler neck, the cap comprising means for closing the mouth of the filler neck, the closing means including a housing and an end closure member coupled to the housing, the end closure member being axially movable relative to the housing and having a sealing ring configured to engage the seal seat upon slidable insertion of the housing into the filler neck in an axially inward cap-installation direction, means for gripping the filler neck in response to sliding axially inward movement of the housing in the filler neck, the gripping means being formed for movement between a filler neck-engaging position and a filler neck-disengaging position and mounted in the housing, the gripping means including three spring-loaded latches positioned in spaced-apart relation about the circumference of the housing, and means for moving the three latches from the filler neck-engaging position to the filler neck-disengaging position, the moving means including a handle cover and means for coupling the handle cover to the three spring-loaded latches so that the latches are rotatably actuated in response to rotational movement of the handle cover relative to the filler neck.

* * * * *